(12) United States Patent
Bober et al.

(10) Patent No.: US 7,044,423 B2
(45) Date of Patent: May 16, 2006

(54) COMPOUND LIFT DEVICE

(76) Inventors: Wieslaw Bober, 350 Fifth Ave., Suite 5817, New York, NY (US) 10118; Jozef Repelewicz, 30-535 Krakow, Wegierska 11/5 (PL); Jozef Malek, 30-535 Krakow, Wegierska 11/2 (PL); Wlodzimierz Smieszek, 31-050 Krakow, Brzozowa 7/7 (PL)

( * ) Notice: Subject to any disclaimer, the term of this patent is extended or adjusted under 35 U.S.C. 154(b) by 120 days.

(21) Appl. No.: 10/722,227

(22) Filed: Nov. 25, 2003

(65) Prior Publication Data

US 2005/0109892 A1    May 26, 2005

(51) Int. Cl.
*F16M 11/00*    (2006.01)
(52) U.S. Cl. .................. 248/188.4; 248/188.2; 248/188.1
(58) Field of Classification Search ............. 248/157, 248/420, 651, 656, 658, 669, 188.1, 188.2, 248/188.4, 188.5, 125.1, 125.2; 187/230
See application file for complete search history.

(56) References Cited

U.S. PATENT DOCUMENTS

| 3,943,844 | A |   | 3/1976  | Standbridge et al. |         |
|-----------|---|---|---------|--------------------|---------|
| 4,400,736 | A |   | 8/1983  | Weiss              |         |
| 6,073,892 | A |   | 6/2000  | Dittmer            |         |
| 6,148,741 | A | * | 11/2000 | Motta              | 108/96  |
| RE37,559  | E | * | 2/2002  | Marue et al.       | 248/405 |
| 6,416,027 | B1| * | 7/2002  | Hart               | 248/324 |
| 6,494,150 | B1|   | 12/2002 | Phoenix et al.     |         |
| 6,796,537 | B1| * | 9/2004  | Lin                | 248/162.1 |
| 6,874,432 | B1| * | 4/2005  | Lanphear           | 108/147 |

* cited by examiner

*Primary Examiner*—Ramon O. Ramirez
*Assistant Examiner*—Steven Marsh
(74) *Attorney, Agent, or Firm*—Wolf Block Schorr & Solis-Cohen LLP (57) ABSTRACT

The present invention is a compound motorized lift device facilitating the uninterrupted and nearly noiseless movement of a low-profile television. The invention is comprised of a base unit, an intermediate unit, and a support unit slidably disposed in a telescoping fashion in the described order. A pair of linearly extensible slides are fastened between base and intermediate units and between intermediate and support units. The intermediate unit is extended and retracted with respect to the base unit in a linear fashion via a motor driven screw. The support unit is extended and retracted in a linear fashion via a cable-pulley arrangement that couples motion by the intermediate unit in a likewise direction to the support unit.

3 Claims, 14 Drawing Sheets

COMPOUND LIFT DEVICE

CROSS REFERENCE TO RELATED APPLICATIONS

None.

FEDERALLY SPONSORED RESEARCH OR DEVELOPMENT

None.

BACKGROUND OF THE INVENTION

1. Field of the Invention

The present invention generally relates to a motorized lift. Specifically, the invention is a compound lift capable of extending a low-profile television from and retracting a low-profile television into a storage cabinet so as to provide volume efficient storage.

2. Description of the Related Art

Television design trends are now focused on low-profile devices including but not limited to plasma screens and LCD panels. Low-profile televisions maximize viewing area and minimize unit depth. However, designs are inherently less decorative, less stable, and heavier than conventional televisions.

Aesthetic and stability deficiencies of low-profile televisions are addressed by housing the television within a cabinet. In such applications, the low-profile television is extended from and retracted into the cabinet via a lift.

While lifts are known within the art, the height of such devices greatly exceeds that of the low-profile television. As such, cabinet dimensions are dictated by the lift envelope rather than by the size of the television thereby favoring volumetrically inefficient designs. Larger cabinets are less desirous in residential settings due to floor space constraints. Furthermore, such cabinets place the television at a height that is less than optimal for viewing conditions within residential settings.

What is currently required is a lift device that is compact and provides for the compact storage of a low-profile television.

What is required is a lift device capable of extending a low-profile television to a height conducive to residential applications.

SUMMARY OF THE INVENTION

An object of the present invention is to provide a television lift device of telescoping design so as to provide for the compact storage of both lift and television.

A further object of the present invention is to provide a lift device of telescoping design so as to provide a viewing arrangement compatible with residential use.

The present invention is a compound motorized lift facilitating the uninterrupted and nearly noiseless movement of a low-profile television. The invention is comprised of a base unit, an intermediate unit, and a support unit slidably disposed in a telescoping fashion in the described order. A pair of linearly extensible slides are fastened between base and intermediate units and between intermediate and support units. The intermediate unit is extended and retracted from the base unit in a linear fashion via a motor driven screw. The support unit is extended and retracted in a linear fashion via a cable-pulley arrangement that couples movement of the intermediate unit to the support unit in a likewise direction.

The base unit is comprised of a plate of planar extent and a first pair of linearly extensible slides separately disposed and parallel. A linear slide is fastened to each length-wise flange along the base unit.

The support unit is comprised of a plate of planar extent and a second pair of linearly extensible slides separately disposed and parallel. A linear slide is fastened to each length-wise flange along the support unit. At least two support elements are adjustably fastened to the support unit so as to facilitate secured attachment of a low-profile display.

The intermediate unit is comprised of a plate of planar extent, a first pair of pulleys attached at one end, and a second pair of pulleys attached along a second end. First and second pairs of linearly extensible slides are separately fastened to the intermediate unit so as to allow movement between intermediate and base units and between support and intermediate units.

A reversible motor is fastened to the base unit and directly coupled to a drive screw. The drive screw is secured to the base unit so as to allow its rotation. The drive screw contacts the intermediate unit thereby imparting linear movement to the intermediate unit via rotation of the drive screw. The intermediate unit extends from and retracts relative to the base unit. The intermediate unit is disposed between base and support units when the compound lift is retracted.

A pair of cables are separately disposed and parallel about the drive screw. Cables are fastened to base and support units and slidably disposed about the intermediate unit via pulleys. Cables impart movement in a likewise direction to the support unit when the intermediate unit is extended and retracted.

In alternate embodiments, the compound lift device further comprises a limit switch fastened to the base unit and electrically connected to the reversible motor so as to control lift function. The limit switch is attached to a rod extending along the length of the base unit and parallel to the drive screw. The rod is attached to the base unit in a secured fashion thereby allowing for movement along its length. The rod has a mechanical stop to STOP and REVERSE the motor when the compound lift device is retracted and a mechanical stop to STOP and REVERSE the motor when the compound lift device is extended.

In yet other embodiments, the compound lift device further comprises a controller communicating with a rotary motion sensor so as to START, STOP and/or REVERSE the motor based upon the rotational history of the drive screw.

Several advantages are offered by the present invention. The invention minimizes cabinet size thereby reducing weight and cost. The invention enables both extension and retraction of a low-profile television in a smooth, stable, and nearly noiseless fashion. The invention facilitates greater height adjustability thereby accommodating a variety of viewing conditions.

BRIEF DESCRIPTION OF THE DRAWINGS

The invention will now be described in more detail, by way of example only, with reference to the accompanying drawings, in which.

REFERENCE NUMERALS

1 Compound lift
2 Base unit
3 Intermediate unit
4 Support unit
5 Horizontal support
6 Holes
7 Horizontal rest
8 Plate
9 Flange
10 C-channel
11 (A, B) Slides
12 Fastener
13 Inner locking plate
14 Fastener
15 Outer locking plate
16 Support bar
17 Outer locking plate
18 Inner locking plate
19 Fastener
20 Support plate
21 Bracket
22 (A, B) Cables
23 Stop
24 Cable fastener
25 U-bolt
26 Cable guide
27 Nut
28 Fastener
29 Ball bearing
30 Bracket
31 Outer arm
32 Bearing support
33 Inner arm
34 Drive screw
35 Flange
36 Motor
37 Limit switch
38 Rod
39 Lower stop
40 Upper stop
41 U-shaped bracket
42 Fastener
43 Coupler
45 Nut
46 (A, B) Pulleys
47 Flange
48 First bushing
49 Fastener
50 Flange
51 Stiffener
52 Plate
53 Flange
54 Second bushing
55 Threaded connector
57 Flat
58 Plate
59 T-shaped connector
60 Nut
61 Spring
62 Flange
63 First cable end
64 Second cable end
66 Wire
70 Low-profile display
100 Transformer
101 Socket
102 Television socket
103 Remote control receiver
104 Remote control transmitter
105 Switch
106 Controller
107 Manual control
108 Rotary motion sensor

DESCRIPTION OF THE INVENTION

Figure 1:
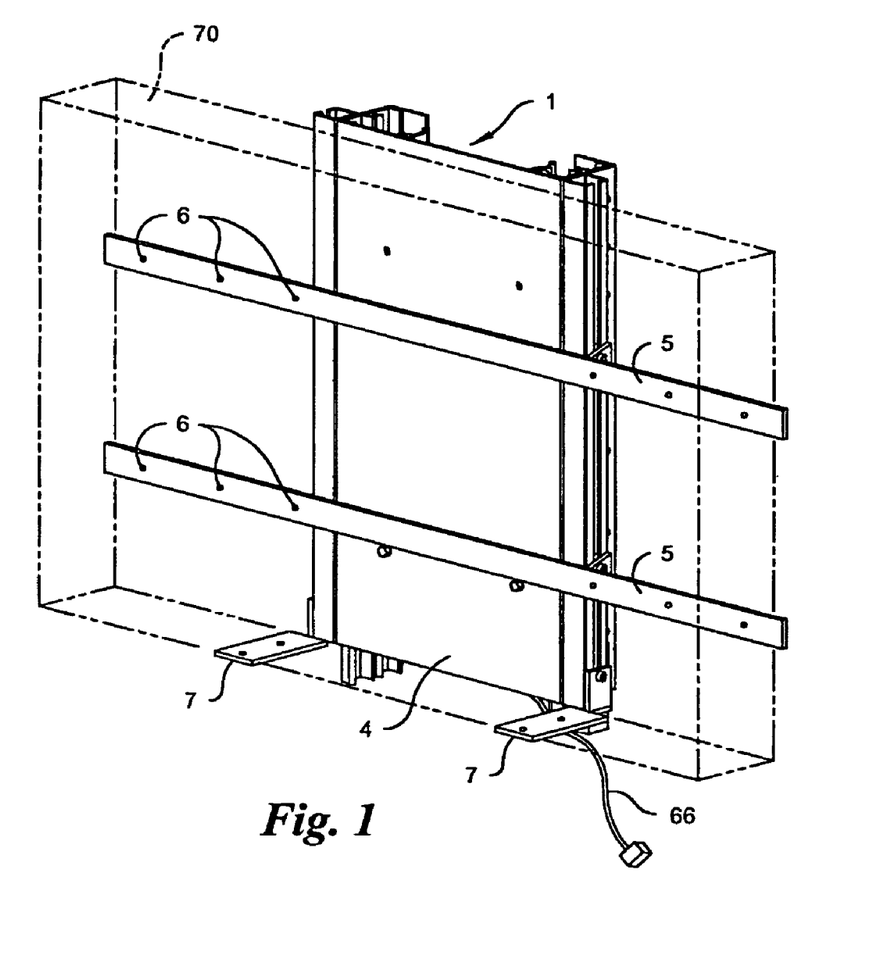
FIG. 1 is a perspective view of the present invention showing front of lift when completely retracted.
Figure 2:
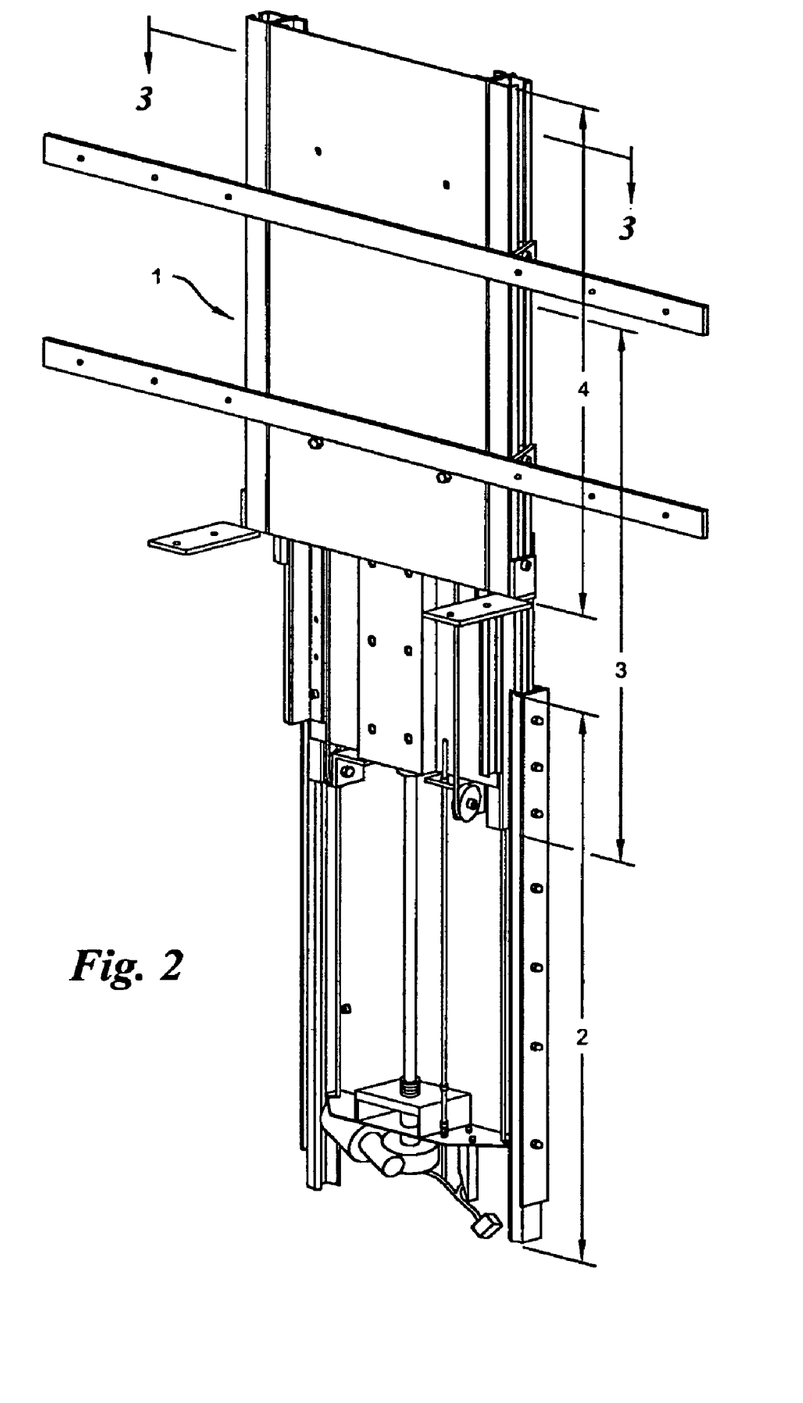
FIG. 2 is a perspective view of the present invention showing front of lift when completely extended.

Referring now to FIG. 1, an exemplary embodiment of the present invention, namely a compound lift 1 capable of extending and retracting a low-profile display 70, is shown in its retracted position wherein a support unit 4, an intermediate unit 3, and a base unit 2 of comparable lengths are arranged in a telescoping-like fashion so as to conceal the intermediate unit 3 behind support unit 4 and base unit 2 behind intermediate unit 3. FIG. 2 shows the same compound lift 1 having both support unit 4 and intermediate unit 3 extended from the base unit 2. The present invention may be mechanically attached to a storage cabinet via methods and techniques understood in the art.

A variety of application are possible for the present invention. For example, the compound lift 1 may raise a low-profile display 70 above or lower a low-profile display 70 below a cabinet in a vertical fashion. Likewise, the compound lift 1 may extend a low-profile display 70 in a horizontal fashion from a floor cabinet or wall mounted cabinet. Therefore, reference to top, bottom, upper, lower, upward and downward are for descriptive purposes only and not intended to limit application of the present invention. Fasteners are defined to include screws, bolts, rivets, and other similar devices understood in the art.

Referring again to FIG. 1, the support unit 4 is shown having a pair of horizontal supports 5 and an optional pair of horizontal rests 7 fastened thereto. It is preferred that the horizontal supports 5 have a plurality of holes 6 along their length to accommodate a variety of mounting configurations for commercially available low-profile displays 70.

Figure 3:
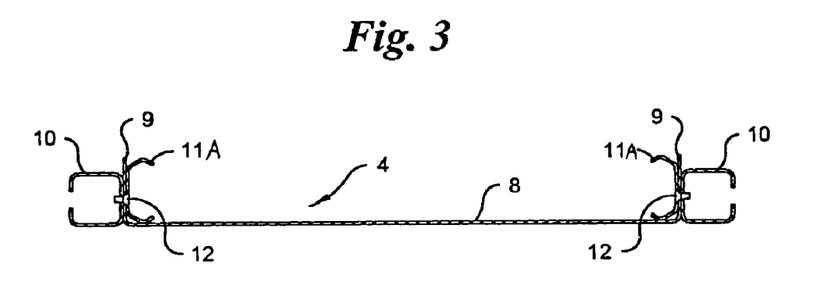
FIG. 3 is a section view of support unit showing attachment of slides and c-channels about flanges along a central plate.

Referring now to FIG. 3, the support unit 4 is comprised of a planar disposed plate 8 having a flange 9 along both edges parallel to the length of the plate 8. The plate 8 may be composed of a metal and the flanges 9 formed via conventional metal forming techniques. A slide 11A is mounted along the inside and a c-channel 10 mounted along the outside of the flange 9 parallel to the slide 11A. Slide 11A and c-channel 10 are secured to the flange 9 via a plurality of fasteners 12. The slide 11A is attached to the flange 9 so as to allow the slide 11A to function in an extendable and retractable fashion.

Figure 4:
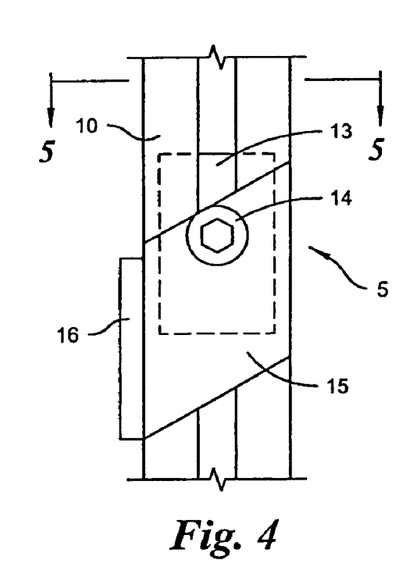
FIG. 4 is an enlarged view showing coupling between horizontal support element and c-channel.
Figure 5:
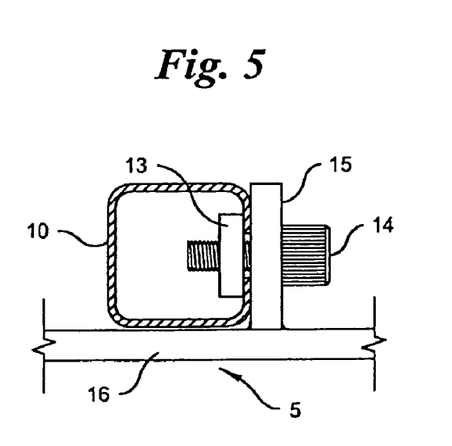
FIG. 5 is an enlarged section view showing coupling between horizontal support element and c-channel.

Referring now to FIGS. 4–5, a horizontal support 5 is shown attached to the c-channel 10. An exemplary horizontal support 5 is comprised of a support bar 16 having a pair of outer locking plates 15 attached thereto, either mechanically fastened or welded, in a perpendicular arrangement. While the outer locking plate 15 may be rectangular shaped, it is preferred to have the outer locking plate 15 angled with respect to the support plate 16, as shown in FIG. 4. An inner locking plate 13 is placed within the c-channel 10, as shown in FIG. 5. Inner locking plate 13 and outer locking plate 15 are co-located along the length of the c-channel 10 and contact the c-channel 10 in a compressive fashion when fastener 14 is threaded through a hole through the inner locking plate 13. The described arrangement fixes the horizontal support 5 to the c-channel 10, however, allows adjustment to the location of the horizontal support 5 along the length of the c-channel 10.

Figure 6:
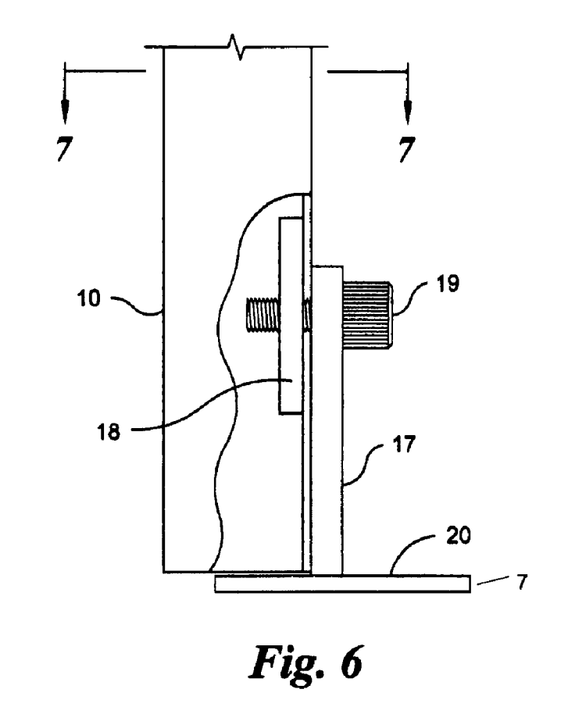
FIG. 6 is an enlarged view showing coupling between horizontal rest and c-channel.
Figure 7:
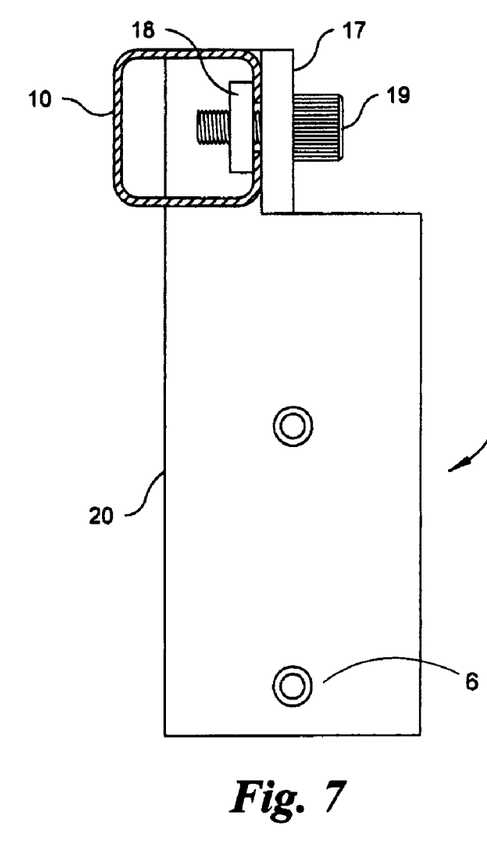
FIG. 7 is an enlarged section view showing coupling between horizontal rest and c-channel.

Referring now to FIGS. 6–7, an optional horizontal rest 7 is shown attached to one end of a c-channel 10. The horizontal rest 7 is preferred when additional support is required to secure a low-profile display 70 onto the support unit 4. The exemplary horizontal rest 7 shown in FIG. 7 is comprised of a support plate 20 fastened, welded or otherwise fixed to an outer locking plate 17 in a perpendicular arrangement. The support plate 20 may have one or more holes 6 so as to allow mechanical attachment to a low-profile display 70. The support plate 20 should contact the end of the c-channel 10 so as to prevent rotation of the horizontal rest 7 when supporting load from a low-profile display 70, as represented in FIG. 6. The outer locking plate 17 and an inner locking plate 18 are co-located adjacent to the end of the c-channel 10 and contact the c-channel 10 in a compressive fashion when fastener 19 is engaged through a hole through the inner locking plate 17. The described arrangement fixes the horizontal rest 7 to the c-channel 10, however, allows for its adjustment and removal.

Figure 8:
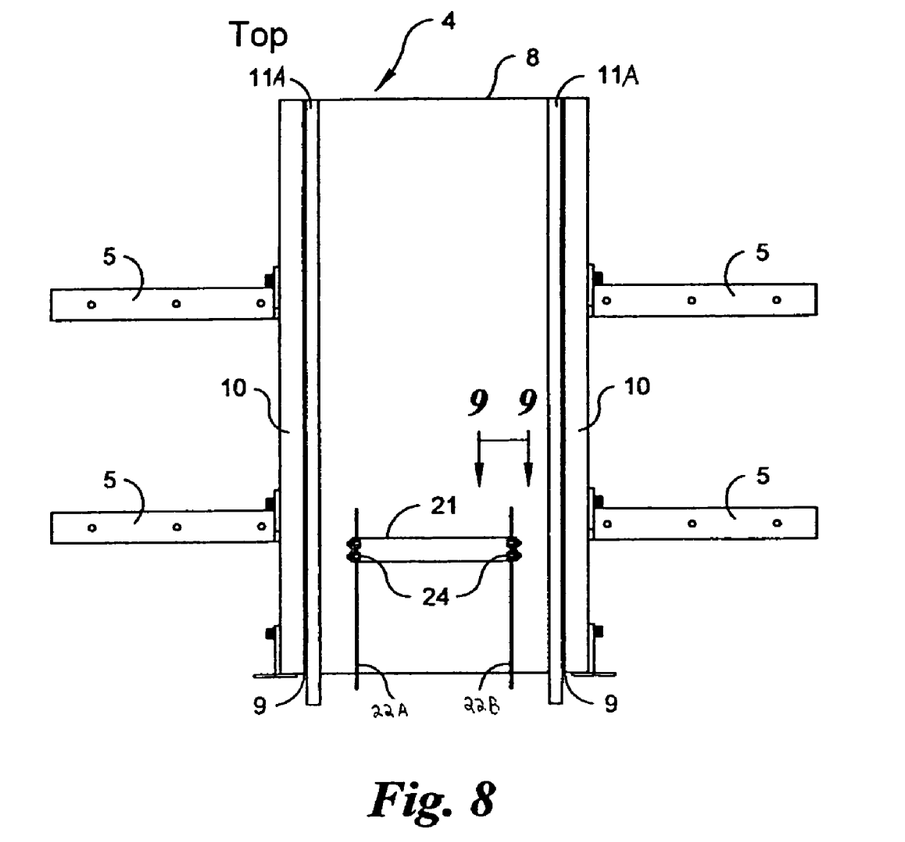
FIG. 8 is an elevation view of rear of support element showing attachment scheme fixing cables to bracket and thereby to support unit.

Referring now to FIG. 8, the rear of the support unit 4 is shown having a bracket 21 mechanically fastened or welded thereto. The bracket 21 facilitates the fastening of a pair of separately disposed but parallel cables 22(A, B) to the support unit 4 via cable fasteners 24. The dual cable 22A arrangement allows for extension and retraction of the support unit 4 via extension and retraction of the intermediate unit 3. While bracket 21 location is design dependent, the extended height of the support unit 4 above the intermediate unit 3 is directly related to the distance between bracket 21 and top of support unit 4.

Cables 22(A, B) are typically elements having a small cross section, yet sufficiently flexible to allow for small radius bends and sufficiently strong to support the weight of a low-profile display 70. For example, it was preferred to have a cable 22A composed of a bundled arrangement of thin wires. In yet other embodiments, the cable 22A was composed of a flexible metal chain.

Figure 9:
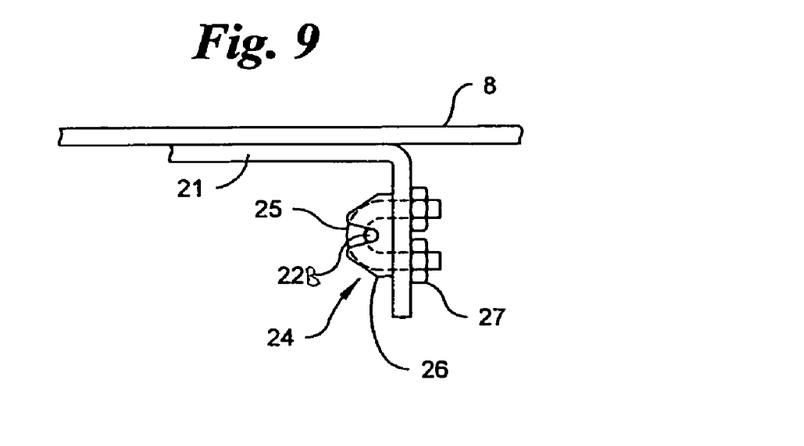
FIG. 9 is an enlarged view of bracket mounted to support unit showing cable secured between u-bolt and cable guide.

Referring now to FIG. 9, an exemplary attachment scheme for cable 22B to plate 8 comprising the support unit 4 is shown in detail. While various hardware schemes are possible, adequate interlock between cable 22B and bracket 21 was achieved by securing the cable 22B between a cable guide 26 having a channel conforming to the shape of the cable 22B and a u-bolt 25. The u-bolt 25 was fastened to bracket 21 and cable guide 26 through a pair of holes separate disposed about the cable 22B passing through each component. A nut 27 was threaded onto the both ends of the u-bolt 25 thereby providing the compression required to secure cable 22B to cable fastener 24 and thereafter to bracket 21. Identical attachment schemes are used for cable 22A.

Figure 10:
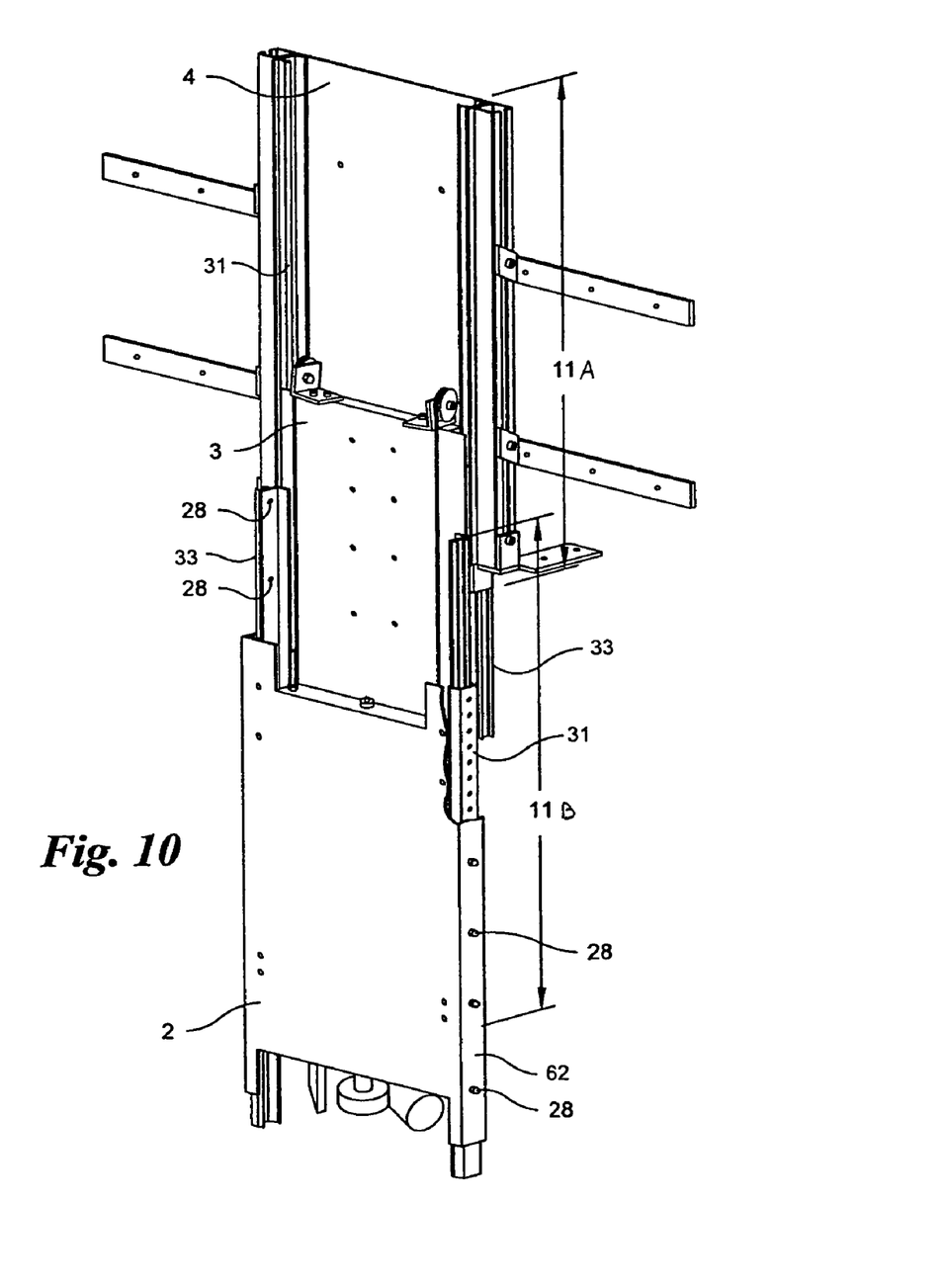
FIG. 10 is a perspective view showing rear of lift when extended having a first pair of slides attached between base and intermediate units and a second pair of slides attached between intermediate and support units.

Referring now to FIG. 10, the present invention is shown with intermediate unit 3 extended from base unit 2 and support unit 4 extended from intermediate unit 3. Extension and retraction between intermediate unit 3 and support unit 4 and between base unit 2 and intermediate unit 3 is achieved via a pair-wise arrangement of linear slides 11A and 11B, respectively. Each slide 11(A, B) is comprised of an outer arm 31 and an inner arm 33. An inner arm 33 is fastened via a plurality of fasteners 28 to the inside of each flange 62 along the base unit 2 as shown in FIG. 10 and to the inside of each flange 9 along the support unit 4 as shown in FIG. 3. Outer arms 31 are fastened to intermediate unit 3 as represented in FIG. 10. Slides 11B and 11A separate base unit 2 from intermediate unit 3 and intermediate unit 3 from support unit 4, respectively, in an offset fashion so as to prevent interference contact during extension and retraction.

Figure 11:
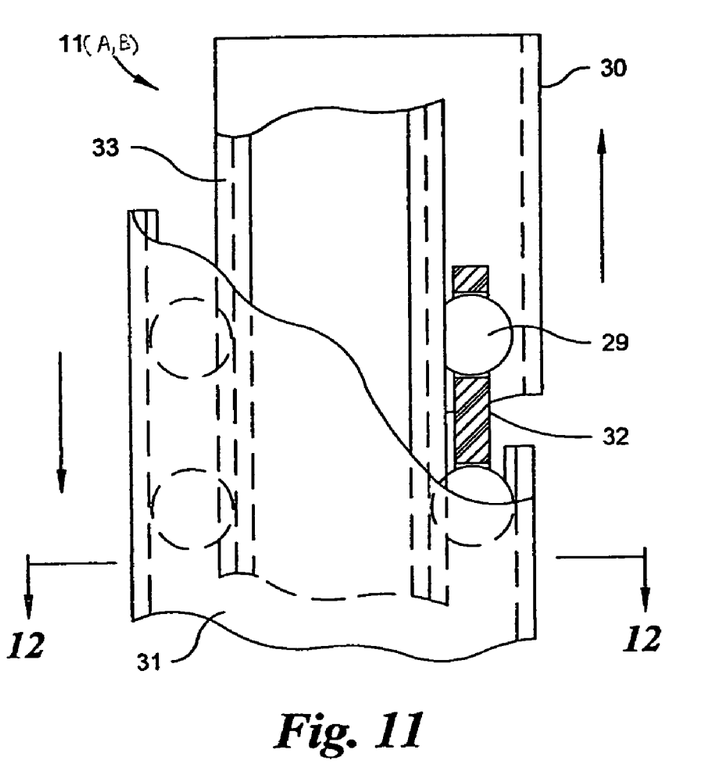
FIG. 11 is a side elevation view of an exemplary linear slide.

A variety of linearly extensible slides 11(A, B) are applicable to the present invention. For example, slides 11(A, B) may be comprised of two movable linear-shaped and interlocking elements having a low-friction polymer there between. However, preferred embodiments consisted of bearing-based slides 11(A, B), as described in FIGS. 11–12. FIG. 11 shows one such slide 11(A, B) having an outer arm 31, an inner arm 33 with bracket 30 fastened or welded thereon, and a bearing support 32 with a plurality of pair-wise arranged ball bearings 29.

Figure 12:
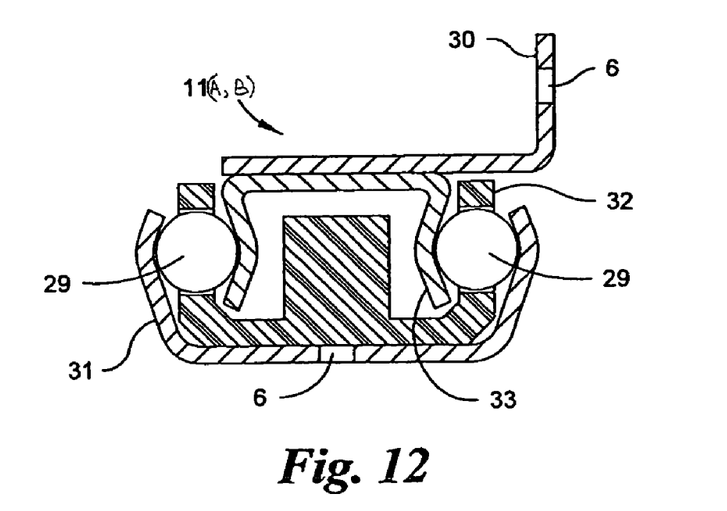
FIG. 12 is a section view of slide from FIG. 11 showing linear arrangement of inner and outer arms about ball bearings contacting and supported by a bearing support.

Referring now to FIG. 12, the outer arm 31 is a u-shaped channel of linear extent. A bearing support 32, also of linear extent, is attached in a fixed fashion to the inside of the outer arm 31 and between outer arm 31 and inner arm 33 so as to secure a plurality of ball bearings 29 along the length of the slide 11 (A, B). While it is preferred to have both inner arm 33 and outer arm 31 composed of a metal, the bearing support 32 should be composed of a low-friction polymer, including but not limited to polytetrafluorethylene and polyethylene. Ball bearings 29 were positioned along the bearing support 32 in holes of like-size dimension so as to allow for their rotation within the holes when inner arm 33 traverses the length of the outer arm 31. A plurality of holes 6 were provided along the length of the outer arm 31 to facilitate attachment with flange 9 along the support unit 4 and with flange 62 along the base unit 2 via fasteners 28, as shown in FIG. 10. A plurality of holes 6 are also provided along the length of the bracket 30 so as to facilitate attachment between slides 11(A, B) and intermediate unit 3 via fasteners 28 along the planar surface of the intermediate unit 3, also shown in FIG. 10.

Figure 13:
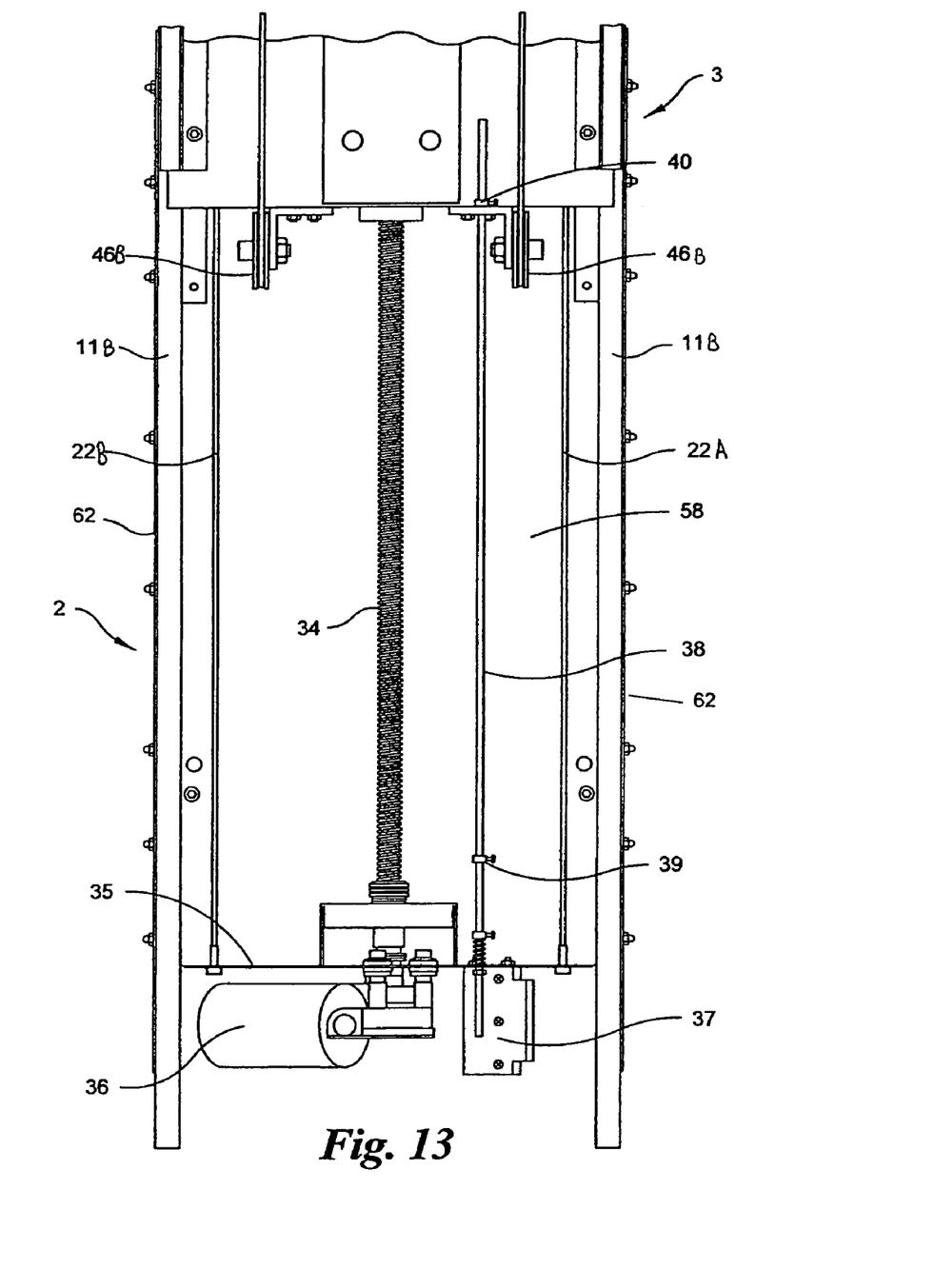
FIG. 13 is an elevation view of front of base unit showing motor attached to a screw lengthwise disposed along the base unit, a rod attached to a limit switch activated by a pair of stops along the rod length, and a pair of cables secured to a flange and contacting a pair of pulleys at one end of the intermediate unit.
Figure 16:
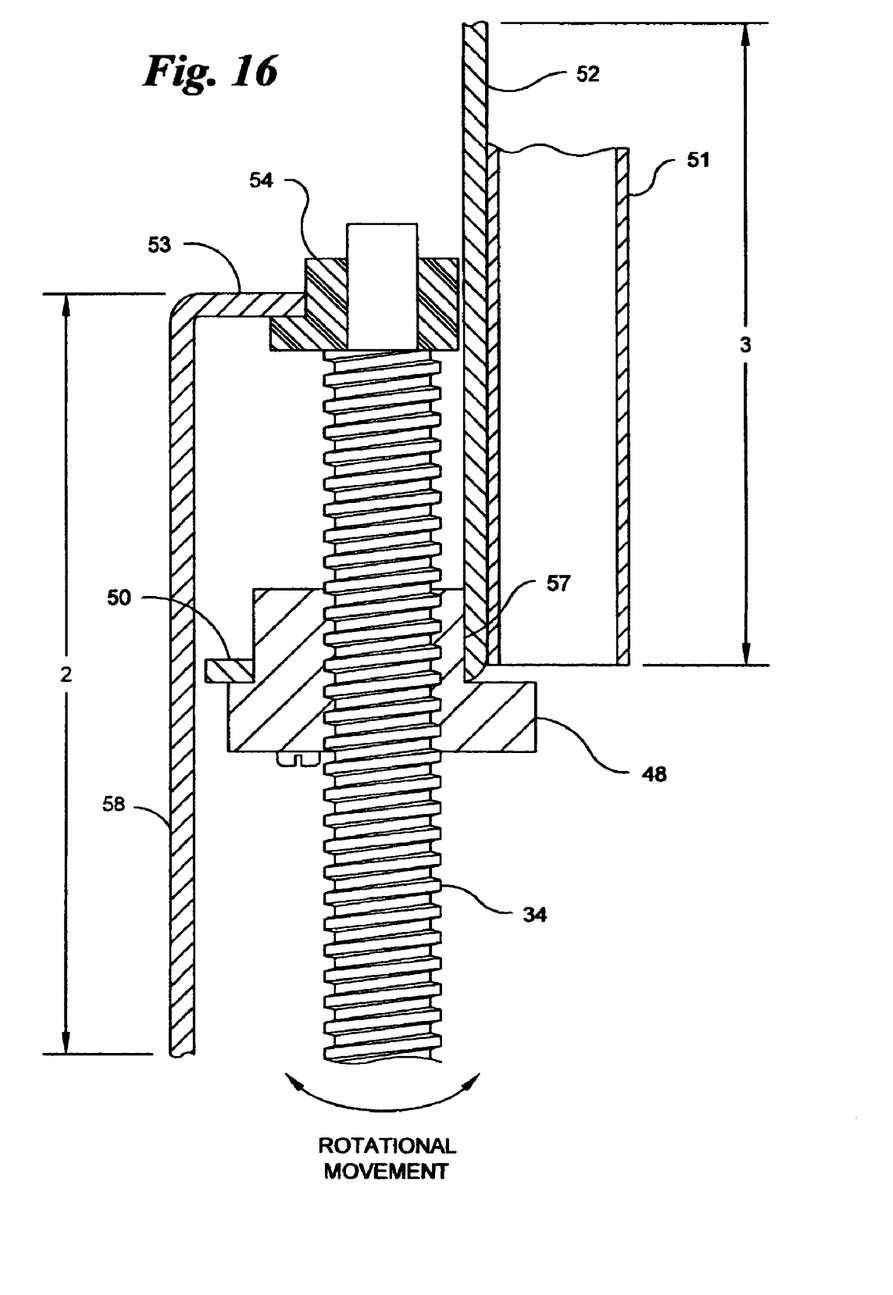
FIG. 16 is a side section view showing drive screw attachment to a flange at the upper end of the base unit and a flange at the lower end of the intermediate element so that the intermediate unit is movable in a linear fashion when drive screw is rotated.

Referring now to FIG. 13, the front of the base unit 2 is shown having a motor 36 at one end and a drive screw 34 along its length. Also shown is a slide 11B fastened to the inside of each of two flanges 62 disposed along the length of the base unit 2 and perpendicular to the plate 58. A flange 35 is located adjacent to the lower end. A fourth flange 53 is located along the upper end adjacent to the intermediate unit 3 attached to and perpendicular to the plate 58, as represented in FIG. 16. Flanges 62 are either welded, mechanically fastened or fabricated using metal shaping techniques. Likewise shown is a pair of cables 22A and 22B traversing the length of the base unit 2 and parallel about the drive screw 34.

Figure 14:
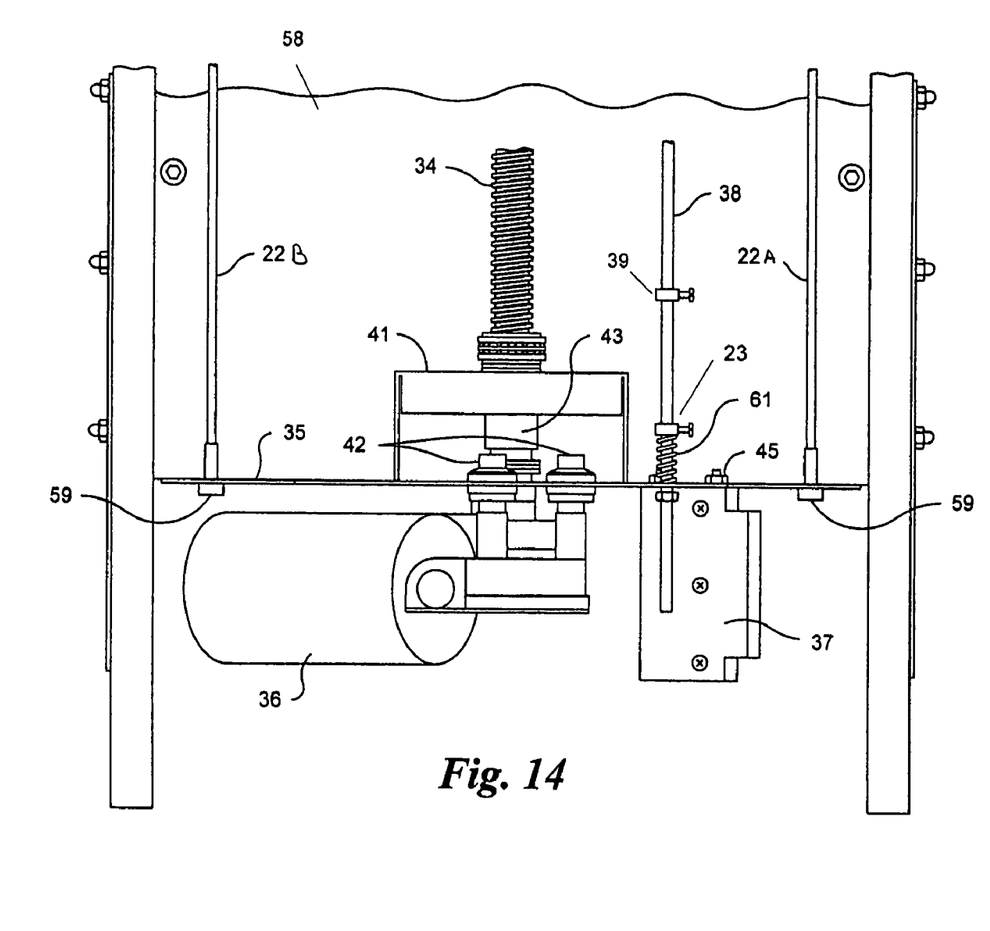
FIG. 14 is an enlarged view showing a motor attached to a flange at one end of the base unit and coupled to a drive screw and a limit switch attached to the flange and coupled to a rod having mechanical stops to control motor function.

The motor 36 is attached via several fasteners 42 to the flange 35 at the lower end of the base unit 2, as shown in FIG. 14. While various motor 36 types are applicable to the present invention, preferred embodiments were reversible and DC powered. One specific example being a 24V motor, model number 403.979 manufactured by Valeo Auto-Electric Wischer und Motoren GmbH (Motors and Actuators Division) with an office at Stuttgarter Strasse 119 D-74321 Bietigheim, Germany.

The motor 36 is directly coupled to the drive screw 34 via a coupler 43 thereby locking the rotational shaft of the motor 36 to the drive screw 34. The coupler 43 is a metal cylinder having a cavity conforming to the end of both motor shaft and drive screw 34. A u-shaped bracket 41 is positioned above the motor 36, adjacent to the coupler 43, and welded to both plate 58 and flange 35. The u-shaped bracket 41 has a hole of slightly larger size than the drive screw 34 so as to allow its rotation yet provide lateral support to the drive screw 34.

Referring again to FIG. 13, an optional rod 38 is provided parallel to the drive screw 34 along the length of the base unit 2. The rod 38 passes through a hole in an unobstructed manner along the flange 35 at the lower end of the base unit 2 and the flange 50 at the lower end of the intermediate unit 3. A lower stop 39 is secured to the rod 38 via a set screw above the flange 35 attached to the base unit 2. A spring 61 is positioned along the length of the rod 38 between lower stop 39 and flange 35 and depressed by a stop 23 when compound lift 1 is retracted, as shown in FIG. 14. An upper stop 40 is likewise secured to the rod 38 via a set screw above the flange 50 along the intermediate unit 3. Stop 23, lower stop 39 and upper stop 40 are cylinder shaped elements disposed about the rod 38. The limit switch 37 is fastened to the flange 35 via at least one nut 45, also shown in FIG. 14. The rod 38 is mechanically attached to the optional limit switch 37 below the flange 35, as shown in FIGS. 13–14.

While limit switches 37 are understood within the art, preferred embodiments of the present invention included a mechanically activated two position electrical device The limit switch 37 is electrically connected to the motor 36 through a controller 106 or directly via a wire 66 shown in FIG. 1.

Interaction between flange 50 and lower stop 39 or upper stop 40 communicates the location of the intermediate unit 3 along its travel length to the limit switch 37. For example, contact between lower stop 39 and flange 50 during retraction moves the rod 38 in a downward direction so as to mechanically trip the limit switch 37 thereby terminating power to the motor 36 and reversing the rotation of motor 36 and drive screw 34 attached thereto. Likewise, contact between upper stop 40 and flange 50 during extension moves the rod 38 in an upward direction so as to mechanically trip the limit switch 37 thereby terminating power to motor 36 and again reversing the rotation of motor 36 and drive screw 34.

Figure 15:
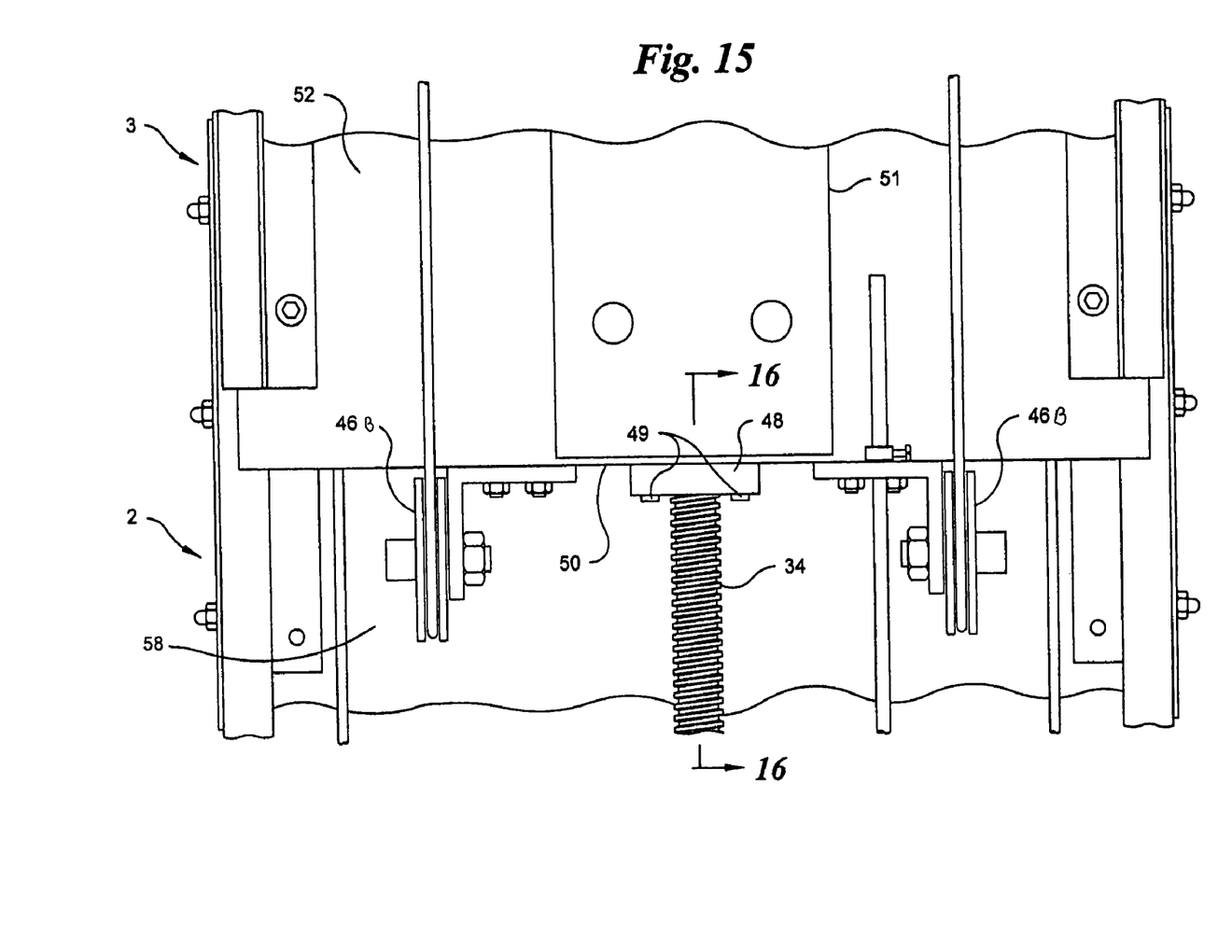
FIG. 15 is an enlarged view of front of the lower end of the intermediate unit and the upper end of the base unit showing drive screw coupled to a bushing attached to a flange along the intermediate unit.

Flanges 47, 50 are located at either end of the planar dispose plate 52 comprising the intermediate unit 3 and may be located to the same side or opposite sides of the plate 52. Plate 52 may be composed of a metal and the flanges 47, 50 formed via conventional metal forming techniques. Referring now to FIG. 15, a stiffener 51, typically a hollow beam or u-shaped element, is mechanically fastened to the plate 52 in a lengthwise fashion so as to resist deflection of the intermediate unit 3 during extension and retraction.

Figure 17:
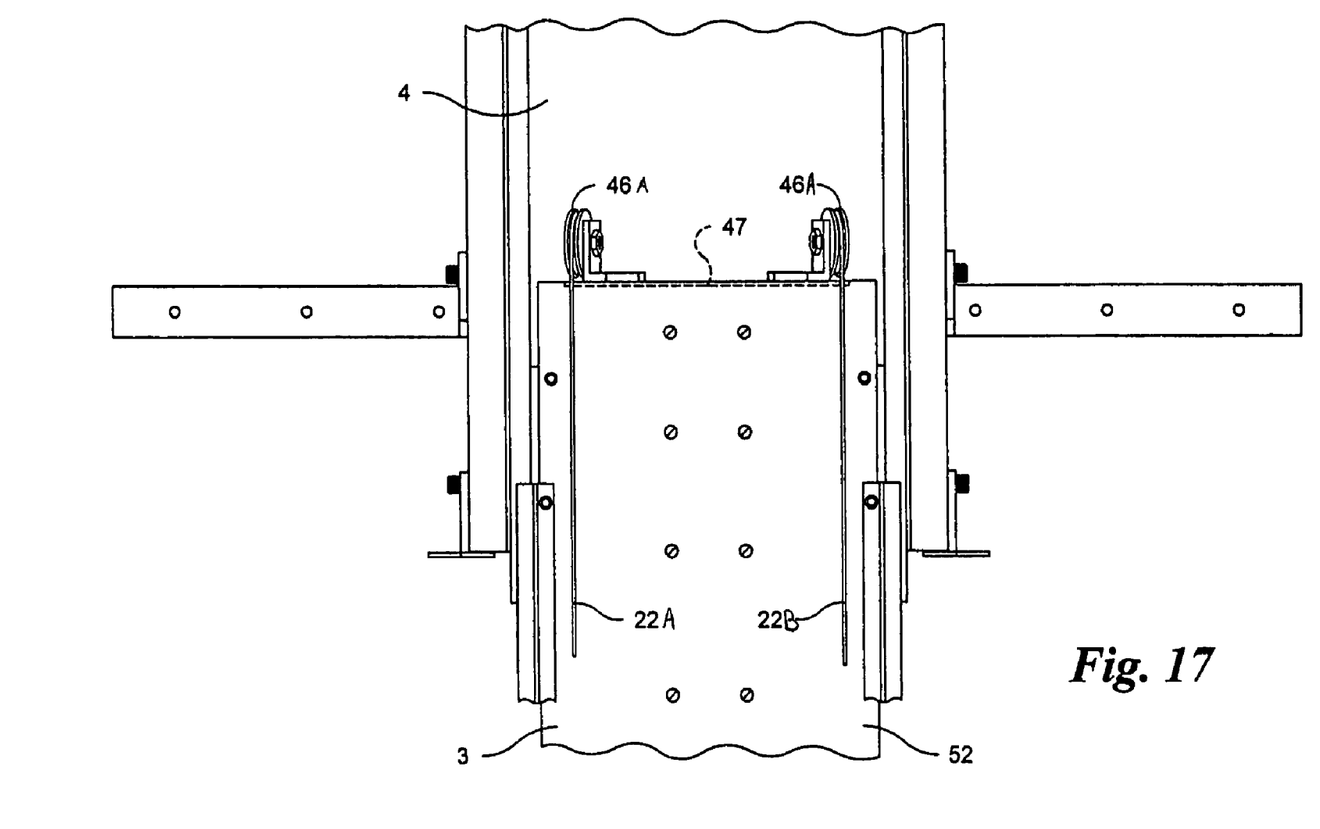
FIG. 17 is a rear elevation view showing the upper end of the intermediate unit having a pair of pulleys and cables thereon.

Referring again to FIG. 15, the drive screw 34 is shown passing through a first bushing 48 mechanically secured to the flange 50 via a pair of fasteners 49. Flange 50 also supports a pair of pulleys 46B oriented in a downward fashion, also mechanically fastened thereto. The upper end of the intermediate unit 3 has a pair of pulleys 46A oriented in an upward direction attached to a flange 47 of identical design and arrangement as in flange 50, as shown in FIG. 17. Pulleys 46(A, B) are angled in an inward direction to minimize their protrusion beyond the flanges 47, 50, yet allowing sufficient distance between cables 22(A, B) and flanges 47, 50 to avoid their contact. Pulleys 46(A, B) and their fastening are understood in the art.

Referring now to FIG. 16, the end of the drive screw 34 is mechanically secured to the flange 53 at the upper end of the base unit 2 via a second bushing 54. It is preferred that the drive screw 34 not have threads along its length contacting the second bushing 54. The second bushing 54 is composed of a low-friction material, preferably a polymer, allowing the drive screw 34 to freely rotate in a secured fashion. The second bushing 54 is held in place via an interference fit between second bushing 54 and hole through flange 53.

Referring again to FIG. 16, rotation of the drive screw 34 is communicated to the intermediate unit 3 via the first bushing 48. First bushing 48 is secured to the flange 50 at the bottom of the intermediate unit 3 between a pair of pulleys 46B. A flat 57 is located along one edge of the first bushing 48 so as to contact the plate 52 and prevent rotation of the first bushing 48 when drive screw 34 rotates. Unlike the second bushing 54 described above, the first bushing 48 is preferred to be composed of a low-friction metal, one example being brass, having a thread pattern of likewise design to engage the thread pattern along the drive screw 34. Rotation of the drive screw 34 is transferred to the first bushing 48 so as to move the intermediate unit 3 attached thereto in a linear fashion along the length of the drive screw 34.

Figure 18:
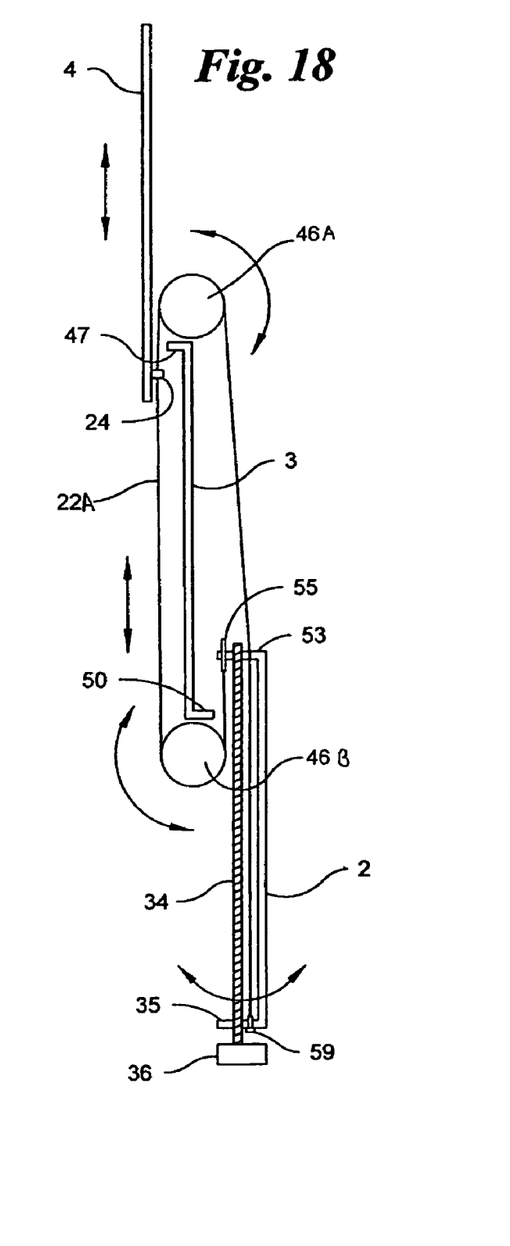
FIG. 18 is a schematic diagram showing cable ends attached to flanges along base unit, contact between cable and pulleys at both ends of intermediate unit, and attachment of cable to support unit so that linear movement of the intermediate unit via the drive screw causes likewise linear movement of the support unit via the cable-pulley arrangement.

While movement of the intermediate unit 3 is via the drive screw 34, movement of the support unit 4 is via cables 22(A, B). Referring now to FIG. 18 shows a schematic diagram describing the arrangement of a cable 22A about one side of the drive screw 34. One end of the cable 22A is fastened to the flange 35 at the lower end of the base unit 2 and vertically aligned upward so to contact a pulley 46A fastened to the flange 47 at the upper end of the intermediate unit 3. Thereafter, the cable 22A is vertically aligned downward so to contact a pulley 46B fastened to the flange 50 at the lower end of the intermediate unit 3. The path of the cable 22A effectively encircles the intermediate unit 3 and contact is effected via a pair of pulleys 46(A, B) along one side of the drive screw 34, as graphically represented in FIG. 18. Thereafter, the end of the cable 22A is fastened to a second flange 53 at the upper end of the base unit 2. The cable 22A is fixed to the rear of the support unit 4 via a cable fastener 24, as described above. The described arrangement is required along both sides of the drive screw 34 to effect coupled movement between intermediate unit 3 and support unit 4.

Figure 19:
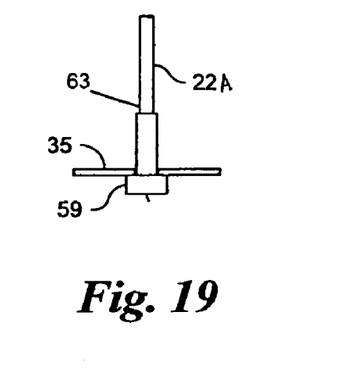
FIG. 19 is an enlarged view of flange at the lower end of the base element and attachment of cable thereto.

Referring now to FIG. 19, the first cable end 63 is terminated by a t-shaped connector 59 crimped, mechanically fastened or welded to the cable 22A. The t-shaped connector 59 either resides within a hole or slot along the flange 35 at the lower end of the base unit 2 thereby securing it to the compound lift 1, as shown in FIG. 14.

Figure 20:
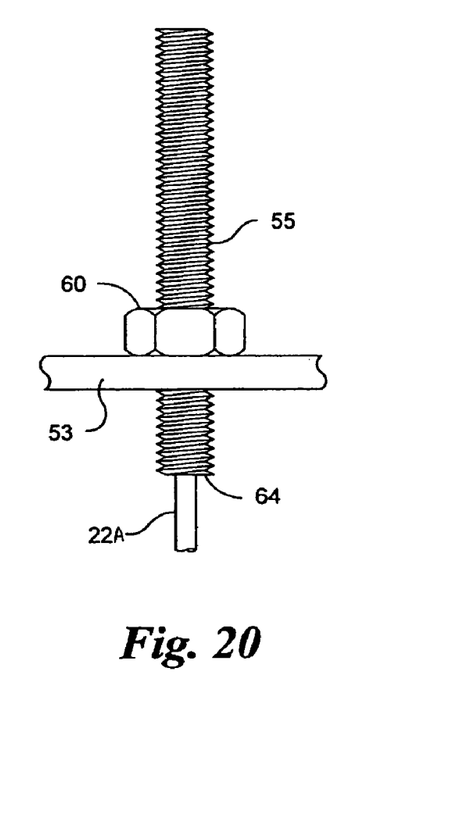
FIG. 20 is an enlarged view of flange at upper end of the base element and attachment of cable thereto via an adjustable rod arrangement.

Referring now to FIG. 20, the second cable end 64 is terminated by a threaded connector 55 also crimped, mechanically fastened or welded to the cable 22A. The threaded connector 55 partially traverses a hole within the flange 53 at the upper end of the base unit 2. A nut 60 is threaded onto the threaded connector 55 and tighten so as to remove slack along the length of the cable 22A.

Figure 21:
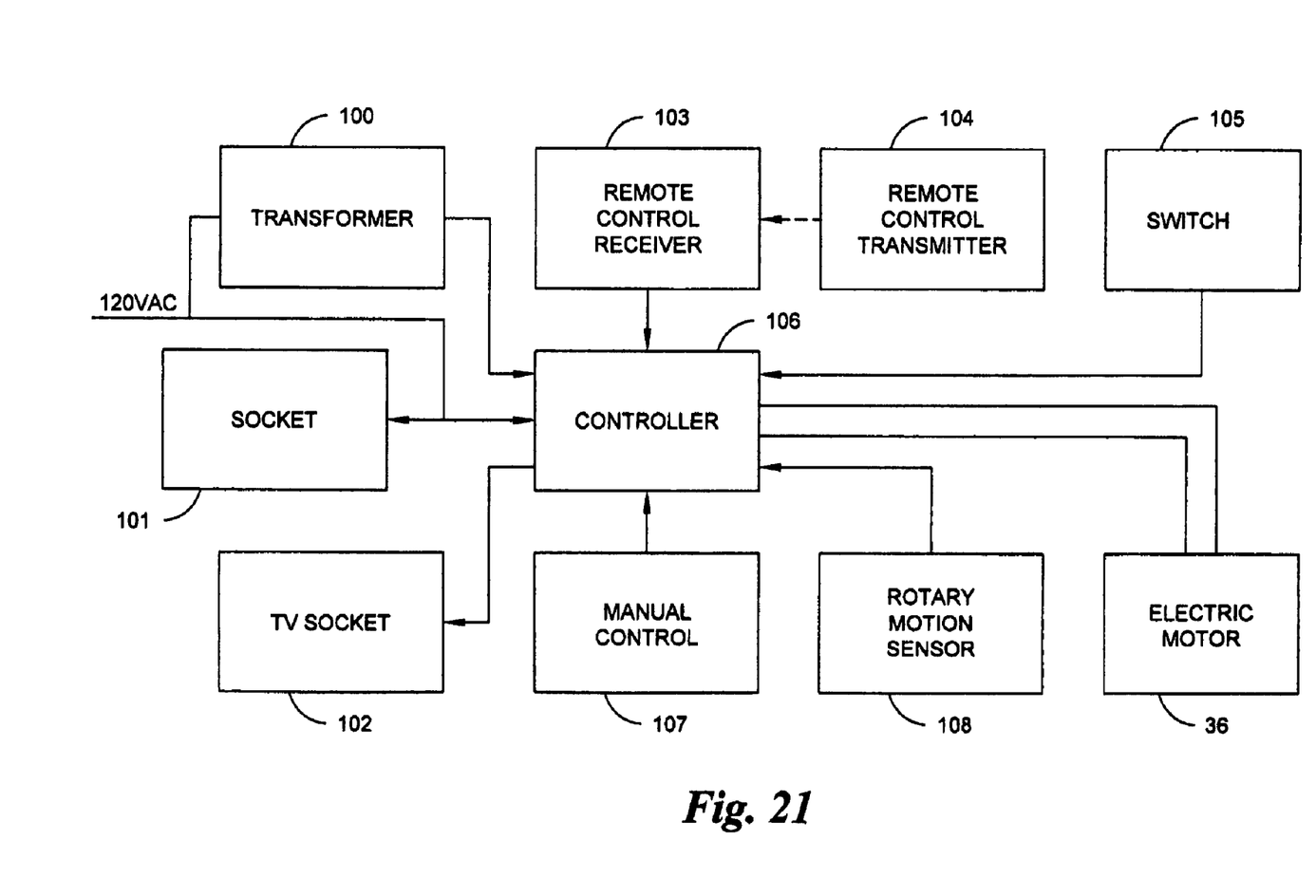
FIG. 21 is a block diagram of the motion control circuit for an exemplary embodiment.

Referring now to FIG. 21, a block diagram describes the control function of the motor 36 and hence extension and retraction of both intermediate unit 3 and support unit 4. A controller 106 is electrically connected between a transformer 100 and a motor 36, all such devices being understood in the art. The transform 100 receives AC power via a power cord thereafter converting it to DC before communicating it to the motor 36.

STOP, START, and REVERSE, are communicated to the controller 106 via one or more means. For example, a remote control transmitter 104 may communicate wireless commands to a remote control receiver 103 electrically connected to the controller 106. It is likewise possible to communicate commands via a switch 105, one example being the limit switch 37 as described above, or other manual control 107, one example being a toggle switch, electrically connected to the controller 106. Furthermore, it is possible to employ a rotary motion sensor 108 which counts the number of rotations and rotational direction of the drive screw 34 so as to map the rotational history of the drive screw 34. The components for such arrangements are understood in the art.

The controller 106 may also control power flow to one more sockets. For example, a television socket 102 may be electrically connected to the controller 106 so that power is automatically communicated to a low-profile display 70 when the compound lift 1 is fully extended and terminate power when retracting. Likewise, it is possible to have an socket 101 electrically connected to the controller 106 so as to provide power to a VCR or DVD when the compound lift 1 is extended or terminate power when retracting.

The description above indicates that a great degree of flexibility is offered in terms of the present invention. Although the present invention has been described in considerable detail with reference to certain preferred versions thereof, other versions are possible. Therefore, the spirit and scope of the appended claims should not be limited to the description of the preferred versions contained herein.

What is claimed is:

1. A compound lift device for controlled movement of a low-profile display comprising:
   (a) a base unit of planar extent having a first pair of linearly extensible slides separately disposed and parallel, one each of said first pair of linearly extensible slides fastened to a flange along the length of said base unit;
   (b) a support unit of planar extent having a second pair of linearly extensible slides separately disposed and parallel, one each of said second pair of linearly extensible slides fastened to a flange along the length of said support unit, said support unit having at least two support elements adjustably fastened thereto so as to facilitate secured attachment of said low-profile display;
   (c) an intermediate unit of planar extent having a first pair of pulleys attached at one end and a second pair of pulleys attached at another end, said first pair of linearly extensible slides and said second pair of linearly extensible slides separately fastened to said intermediate unit so as to allow movement between said intermediate unit and said base unit and between said support unit and said intermediate unit, said intermediate unit sufficiently stiff so as to resist deflection of said intermediate unit during extension and retraction;
   (d) a reversible motor fastened to said base unit and directly coupled to a drive screw, said drive screw secured to said base unit so as to allow its rotation, said drive screw contacting said intermediate unit thereby communicating linear movement to said intermediate unit via rotation of said drive screw, said intermediate unit extending and retracting with respect to said base unit, said intermediate unit disposed between said base unit and said support unit when said compound lift device is retracted; and
   (e) two cables separately disposed about and parallel to said drive screw, said two cables each having two cable ends fastened to said base unit, said two cables fastened along its length to said support unit, said two cables slidably disposed about said intermediate unit via said first pair of pulleys and said second pair of pulleys, said two cables imparting likewise movement to said support unit when said intermediate unit is extended and retracted.

2. The compound lift device of claim 1, further comprising:
   (f) a limit switch fastened to said base unit, said limit switch electrically connected to said reversible motor or a controller so as to control function, said limit switch having a rod extending along said base unit, parallel to said drive screw, and attached to said base unit in a movable fashion, said rod having a lower stop to stop and reverse said motor when said compound lift device is retracted and an upper stop to stop and reverse said motor when said compound lift device is extended.

3. The compound lift device of claim 1, further comprising:
   (f) a rotary motion sensor adjacent to said drive screw and communicating with said controller so as to stop and reverse said motor based on rotational history of said drive screw.

* * * * *